US011232101B2

(12) United States Patent
Ni

(10) Patent No.: US 11,232,101 B2
(45) Date of Patent: Jan. 25, 2022

(54) COMBO OF LANGUAGE UNDERSTANDING AND INFORMATION RETRIEVAL

(71) Applicant: Microsoft Technology Licensing, LLC, Redmond, WA (US)

(72) Inventor: Yong Ni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 16/331,083

(22) PCT Filed: Oct. 10, 2016

(86) PCT No.: PCT/CN2016/101649
§ 371 (c)(1),
(2) Date: Mar. 6, 2019

(87) PCT Pub. No.: WO2018/068176
PCT Pub. Date: Apr. 19, 2018

(65) Prior Publication Data
US 2019/0205301 A1 Jul. 4, 2019

(51) Int. Cl.
*G06F 16/2452* (2019.01)
*G06F 16/332* (2019.01)
(Continued)

(52) U.S. Cl.
CPC .... *G06F 16/24522* (2019.01); *G06F 16/3329* (2019.01); *G06F 40/211* (2020.01);
(Continued)

(58) Field of Classification Search
CPC ................................................ G06F 16/24522
See application file for complete search history.

(56) References Cited

U.S. PATENT DOCUMENTS 7,139,695 B2 11/2006 Castellanos
7,283,992 B2 * 10/2007 Liu ........................ G06F 16/40
(Continued)

FOREIGN PATENT DOCUMENTS

CN 103927339 A 7/2014

OTHER PUBLICATIONS

El-Kahky, et al., "Extending domain coverage of language understanding systems via intent transfer between domains using knowledge graphs and search Query click logs", In Proceedings of IEEE International Conference on Acoustic, Speech and Signal Processing, May 4, 2014, pp. 4087-4091.
(Continued)

*Primary Examiner* — Shaun Roberts
(74) *Attorney, Agent, or Firm* — Schwegman Lundberg & Woessner, P.A.

(57) ABSTRACT

A method, an apparatus and a system for information retrieval are provided. The method for information retrieval may comprise: receiving a query in a natural language form from a user (210); extracting a plurality of feature vectors from the query based on a plurality of knowledge entries in a knowledge base associated with the user and a built-in featurization source, one feature vector per knowledge entry (220); obtaining, with a pre-trained language understanding model, a plurality of language understanding results based on the plurality of feature vectors (230); and selecting a knowledge entry corresponding to the query among the plurality of entries based on the plurality of language understanding results (240). The method may extract more features and combine information retrieval and language understanding in one shot to improve efficiency.

20 Claims, 7 Drawing Sheets

(51) Int. Cl.

| | |
|---|---|
| ***G06F 40/30*** | (2020.01) |
| ***G06F 40/211*** | (2020.01) |
| ***G06F 40/247*** | (2020.01) |
| ***G06F 40/284*** | (2020.01) |
| ***G06F 40/295*** | (2020.01) |

(52) U.S. Cl.

CPC .......... *G06F 40/247* (2020.01); *G06F 40/284* (2020.01); *G06F 40/295* (2020.01); *G06F 40/30* (2020.01)

(56) References Cited

U.S. PATENT DOCUMENTS

| | | | | |
|---|---|---|---|---|
| 7,421,433 | B2 * | 9/2008 | Xu | G06F 16/30 |
| 7,610,191 | B2 | 10/2009 | Gao et al. | |
| 8,065,151 | B1 * | 11/2011 | Bangalore | G10L 15/193 704/270 |
| 8,843,470 | B2 | 9/2014 | Li et al. | |
| 9,183,183 | B2 | 11/2015 | Barve et al. | |
| 9,183,196 | B1 | 11/2015 | Uszkoreit et al. | |
| 9,190,054 | B1 | 11/2015 | Riley et al. | |
| 9,280,788 | B2 | 3/2016 | Ferrari et al. | |
| 9,280,967 | B2 * | 3/2016 | Fume | G10L 13/10 |
| 9,424,840 | B1 | 8/2016 | Gundeti et al. | |
| 9,710,534 | B2 * | 7/2017 | Hassanzadeh | G06F 16/9535 |
| 2007/0041667 | A1 * | 2/2007 | Cox | H04H 60/37 382/305 |
| 2010/0114571 | A1 * | 5/2010 | Nagatomo | G06F 16/433 704/235 |
| 2010/0205198 | A1 * | 8/2010 | Mishne | G06F 16/3346 707/759 |
| 2011/0125791 | A1 | 5/2011 | Konig et al. | |
| 2012/0030206 | A1 | 2/2012 | Shi et al. | |
| 2012/0209853 | A1 * | 8/2012 | Desai | G06F 16/93 707/741 |
| 2012/0265535 | A1 * | 10/2012 | Bryant-Rich | G06F 3/167 704/270 |
| 2013/0007585 | A1 | 1/2013 | Chow | |
| 2014/0236575 | A1 | 8/2014 | Tur et al. | |
| 2014/0278355 | A1 | 9/2014 | Sarikaya et al. | |
| 2014/0278435 | A1 * | 9/2014 | Ganong, III | G10L 15/22 704/275 |
| 2015/0032442 | A1 | 1/2015 | Marcus | |
| 2015/0066496 | A1 | 3/2015 | Deoras et al. | |
| 2015/0127319 | A1 | 5/2015 | Hwang et al. | |
| 2016/0070731 | A1 * | 3/2016 | Chang | G06Q 30/00 707/741 |
| 2017/0242914 | A1 * | 8/2017 | Gao | G06F 16/3329 |

OTHER PUBLICATIONS

Sun, et al., "Canonical Correlation Analysis for Multilabel Classification: A Least-Squares Formulation, Extensions, and Analysis", In Journal of IEEE Transactions on Pattern Analysis and Machine Intelligence, vol. 33, No. 1, Jan. 2011, pp. 194-200.

"International search Report and Written Opinion Issued In PCT Application No. PCT/CN2016/101649", dated Jun. 19, 2017, 7 Pages.

"Extended Search Report Issued in European Patent Application No. 16918575.8", dated Mar. 30, 2020, 8 Pages.

"Office Action Issued in European Patent Application No. 16918575.8", dated Aug. 18, 2020, 6 Pages.

"Summons To Attend Oral Proceedings issued in European Patent Application No. 16918575.8", Mailed Date Dec. 15, 2020, 8 Pages.

* cited by examiner

COMBO OF LANGUAGE UNDERSTANDING AND INFORMATION RETRIEVAL

CROSS-REFERENCE TO RELATED APPLICATIONS

This application is a U.S. National Stage Filing under 35 U.S.C, 371 of international Patent Application Serial No. PCT/CN2016/101649, filed Oct. 10, 2016, and published as WO 2018/068176 A1 on Apr. 19, 2018, which application and publication are incorporated herein by reference in their entirety.

BACKGROUND

Natural language understanding can be applied to a diverse set of computer applications, ranging from small relative simple tasks such as short commands issued to robots, to highly complex endeavors such as the full comprehension of newspaper articles. Recently, natural language understanding has successfully applied for information retrieval. However, an additional effort is needed to parse and retrieve the actual useful information after bootstrapping natural language understanding result in a real system.

SUMMARY

The following summary is provided to introduce a selection of concepts in a simplified form that arc further described below in the detailed description. This summary is not intended to identify key features or essential features of the claimed subject matter, nor is it intended to be used to limit the scope of the claimed subject matter.

In one aspect, the present disclosure provides a method for information retrieval. The method may comprises: receiving a query in a natural language form from a user; extracting a plurality of feature vectors from the query based on a plurality of knowledge entries in a knowledge base associated with the user and a built-in featurization source, one feature vector per knowledge entry; obtaining, with a pre-trained language understanding model, a plurality of language understanding results based on the plurality of feature vectors; and selecting a knowledge entry corresponding to the query among the plurality of entries based on the plurality of language understanding results.

In another aspect, the present disclosure provides an apparatus for information retrieval. The apparatus may comprise: a receiving module configured for receiving a query in a natural language form from a user; an extracting module configured for extracting a plurality of feature vectors from the query based on a plurality of knowledge entries in a knowledge base associated with the user and a built-in featurization source, one feature vector per knowledge entry; an obtaining module configured for obtaining, with a pre-trained language understanding model, a plurality of language understanding results based on the plurality of feature vectors; and a selecting module configured for selecting a knowledge entry corresponding to the query among the plurality of knowledge entries based on the plurality of language understanding results.

In another aspect, the present disclosure provides a system for information retrieval. The system may comprise one or more processors and a memory. The memory may store computer-executable instructions that, when executed, cause the one or more processors to perform any steps of the method for information retrieval according to various aspects of the present disclosure.

It should be noted that the above one or more aspects comprise the features hereinafter fully described and particularly pointed out in the claims. The following description and the drawings set forth in detail certain illustrative features of the one or more aspects. These features arc only indicative of a few of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
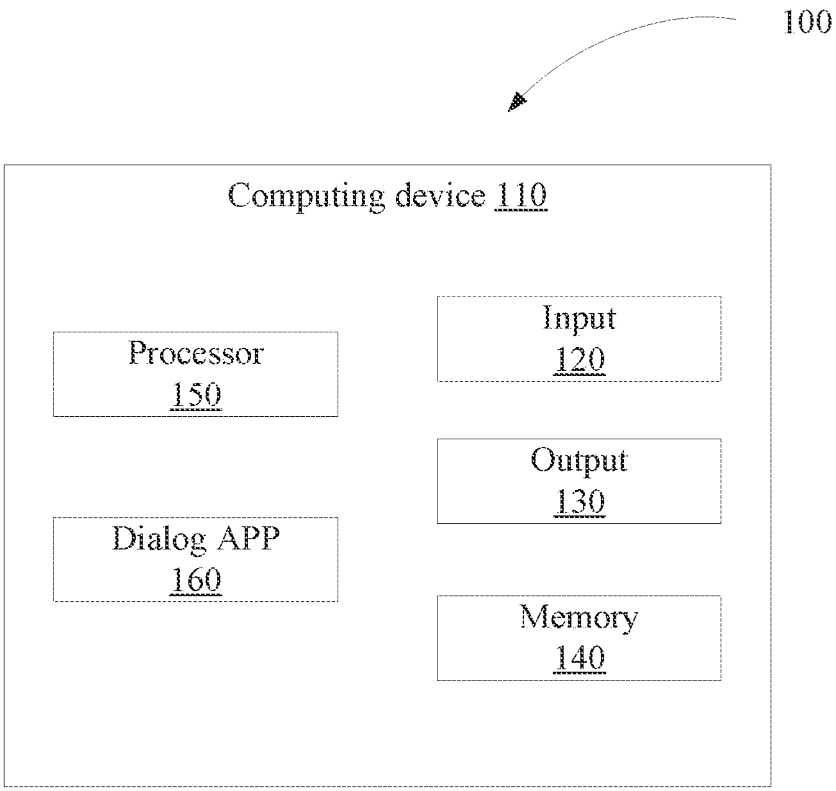
FIG. 1 illustrates an environment in an example implementation according to an embodiment of the present disclosure.

The present disclosure will now be discussed with reference to several example implementations. It is to be understood these implementations art discussed only for enabling those skilled persons in the art to better understand and thus implement the embodiments of the present disclosure, rather than suggesting any limitations on the scope of the present disclosure.

With the development of natural language understating techniques, human can interact with a machine, such as a computer, a wireless phone and the like, in a natural language, such as a speech or a text. A user may launch an application with a speech command. The user may command the machine to save his/her reminders. The user may issue a speech query to request the machine to search these reminders for a desired reminder. In order to find the desired reminder to respond to the query, a conventional method needs to parse and retrieve the actual useful information after bootstrapping the language understanding results. For example, in order to respond "what kind of my niece wants for her birthday", the conventional method needs to perform language understanding on the user query. First, the user query is mapped into an N-dimensional feature space to generate a computable feature vector for computations. The N-dimensional feature space is setup during a slot model training process by extracting information from a training data set, and leveraging prepared and fixed data set (e.g. lexicons and grammars). Each element in such a computable feature vector may be called an internal model feature. Then against the trained slot model, a slot tagging may be conducted on the generated feature vector to identify some meaningful entities with pre-defined tags. The result of the language understanding (i.e., the tagged entities) may be used to run information retrieval algorithm against the previously saved reminders of the user to get the best match and respond that to the user.

The present disclosure may expand the N-dimensional feature space by adding more external features based on external knowledge set. In the present disclosure, an internal model feature and an external feature are a pair of relative terms. The internal model feature may represent a feature extracted based on a built-in source for training a language understanding model. An external feature may represent a feature extracted based on information external to the model. During the model training process, some pre-prepared files may be needed to model the weights for those external features, such that those external features can be used during the runtime when there are live external knowledge data coining in to actually produce the feature value based on the user query. The pro-prepared file may comprise a textfile including words describing a person, a textfile including words describing time, a textfile including words describing a location or a textfile including words describing a thing. The pre-prepared file may also comprise a dictionary including synonyms.

During the runtime, a plurality of knowledge entries in a knowledge base may be used individually to produce multiple language understanding results. On each fetched knowledge entry, there will be one generated feature vector from the input query. After language understanding, there will be one set of language understanding results. Since the plurality of knowledge entries are used individually, some useful information may be attached to each knowledge entry during language understanding to help information retrieval. Then a knowledge entry corresponding to the query may be selected among the plurality of knowledge entries based on similarity scores computed from each knowledge entry across all language understanding results. In the present disclosure, information retrieval processing can be embedded when the external information is consumed in language understanding. Thus, information retrieval and language understanding can be combined in one shot to improve efficiency. Furthermore, since more features than the conventional method may be extracted from the user query, more accurate language understanding result may be obtained.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

FIG. 1 illustrates an environment 100 in an example implementation that is operable to employ the techniques described in the present disclosure. The illustrated environment 100 includes an example of a computing device 110 that may be configured in a variety ways. For example, the computing device 110 may be configured as a traditional computer (such as a desktop personal computer, laptop personal computer and so on), an entertainment appliance, a set-box communicatively coupled to a television, a smart phone, a netbook and so on. Thus the computing device 110 may range from a full resource device with substantial memory and processor resources (e.g., personal computers) to a low-resource device with limited memory and/or processing resources (e.g., traditional set-boxes, hand held game controls).

The computing device 110 may include an input apparatus 120 and an output apparatus 130. The input apparatus 120 may include a mouse, a keyboard, a touch screen, a microphone, a camera and so on. The output apparatus 130 may include a display, a touch screen, a speaker and so on. The computing device 110 may also include a processor 150 for executing applications and a memory 140 for storing data and instructions.

The computing device 110 may include a human-machine dialog application 160 employing the techniques described in the present disclosure. The human-machine dialog application 160 may be pre-loaded on the computing device 110 in the factory. The human-machine dialog application 160 may also be downloaded into the computing device 110 by a user. After the human-machine dialog application 160 is launched, the user may interact with the computing device 110 in a natural language, such as a speech. For example, the user may speak "Remember my niece's birthday is May 4th", which may be acquired by the input apparatus 120 such as a microphone. The input apparatus 120 may feed this speech information into the human-machine dialog application 160, which may convert this speech information with a speech recognition algorithm into a text and store the text as a reminder in the memory 140. As another example, the user may speak to the microphone "what kind of laptop my niece wants for her birthday". This speech information may then be input to the human-machine dialog application 160, which may convert this speech information into a text with the speech recognition algorithm and apply the techniques described the present disclosure to the text to obtain an answer to the question. The answer may be converted into a speech by a speech synthesis algorithm and be output through the output apparatus 130 such as a speaker to respond to the user.

Having described an example operating environment in which the techniques described herein may be employed, consider now a discussion of various embodiments.

Figure 2:
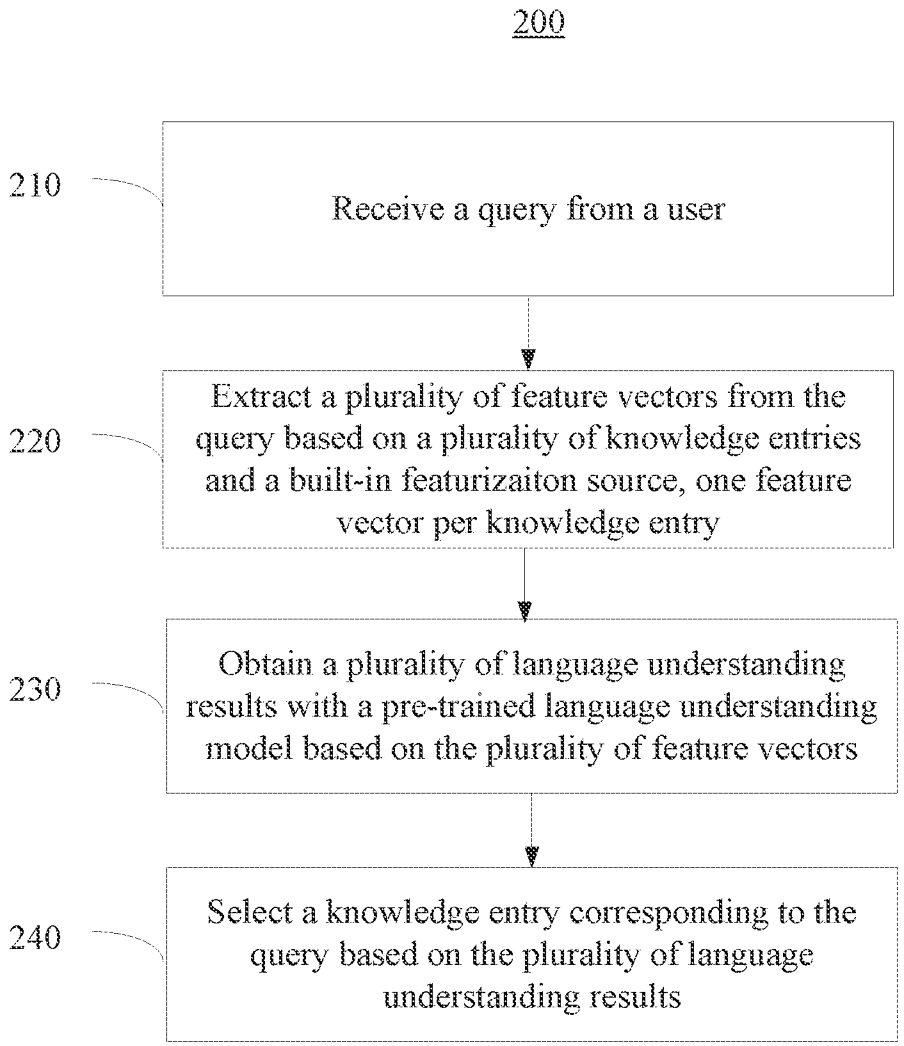
FIG. 2 illustrates a flow chart of a method for information retrieval according to an embodiment of the present disclosure.

FIG. 2 illustrates a flow chart of a method 200 for information retrieval according to an embodiment of the present disclosure.

In step 210, a query may be received from a user. The query may be a text input including a sequence of words or a speech input including a sequence of utterances. The speech input may be converted into a text input by a speech recognition algorithm. The query may be about weather, locations, routes and so on, such as "what is the weather today in Beijing", "what kind of laptop my niece wants for her birthday".

In step 220, a plurality of feature vectors may be extracted from the query based on a built-in featurization source and a plurality of knowledge entries in a knowledge base associated with the user, one feature vector per knowledge entry. A feature extracted from the user query based on the built-in source may be called as an internal model feature in the present disclosure. A feature extracted from the user query based on a knowledge entry in a knowledge base external to the language understanding model may be called as an external feature in the present disclosure. Each of the plurality of feature vectors may be composed of internal model features and external features. It will be described in FIG. 3A how to extract one of the plurality of feature vectors from the query based on the built-in featurization source and one of the plurality knowledge entries.

The built-in featurization source may be associated with those data used for training a language understanding model and setting up a feature space during a training process, such as vocabulary from the training data set, or predefined lexicons and grammars.

The knowledge base associated with the user may store the user's profile. For example, websites previously accessed by the user, locations where the user has went, contacts information of the user, reminders previously saved by the user and the like may be stored in the knowledge base. The knowledge base may be used as an external information source in the present disclosure during the runtime to extract external features from the user query. In an embodiment of the present disclosure, a knowledge entry may be stored in a simple text format in the knowledge base. In another embodiment of the present disclosure, a knowledge entry in the knowledge base may be pro-annotated when it is acquired. For example, when a reminder is acquired from a user, language understanding techniques may be applied to the reminder to get pre-annotations on the reminder. The key is to tag the raw information with more schematized information, targeting to the more realistic application needs, for example, tagging specific types like "Person", "Time", "Location" and "Keyword" to be ready for later requests of user asking "Who", "When", "Where" and "What" respectively.

In an embodiment of the present disclosure, some semantic expansion or data mining techniques may be used during pre-annotation to expand or resolve information for some words. For example, a dictionary including synonyms or similar words may be introduced to expand some words. Thus, richer information can be got to help do more accurate understanding later.

For example, when a reminder "Remember my niece's birthday is May 4th" is acquired from a user, a language understanding algorithm may be applied to this reminder to get a result as {"ID":"1","Text":"my niece's birthday is May 4th","Attributes":[{"Name":"Person","Value":[{"Text": "niece",KnownAs:["Niece"]}]},{"Name":"Time","Value": [{"Text":"May 4th",KnownAs:["XXXX-05-04"]}]}, {"Name":"Keyword","Value":[{"Text":"birthday", KnownAs:[ ]}]}]}. Then the result is stored in the knowledge base associated with the user as a knowledge entry. In another example, the result of pre-annotation to "Remember my niece wants a Surface Book as her birthday gift" may be {"ID":"2","Text":"my niece wants a Surface Book as her birthday gift","Attributes":[{"Name":"Person", "Value":[{"Text":"niece",KnownAs:["Niece"]}]}, {"Name":"Keyword", "Value":[{"Text":"Surface Book", KnownAs:["laptop","surface","Microsoft Surface"]}, {"Text":"birthday",KnownAs:[ ]}]}]}. Thereby, the knowledge base associated with the user may store richer information than simple text information. This knowledge base with pre-annotated knowledge will be very useful to conduct the information retrieval more precisely.

In step 230, a plurality of language understanding results may be obtained with a pre-trained language understanding model based on the plurality of feature vectors. In an embodiment of the present disclosure, each of the plurality of language understanding results may include a set of tagged slots, such as a set of keywords from the user query. In an embodiment of the present disclosure, each of the plurality of language understanding results may further include an indication about which word or words in the respective knowledge entry falling into the set of tagged slots in the result. In the embodiment where the knowledge entries are lagged with schematized information, the indication may be about which tagged entities in the respective knowledge entry falling into the set of keywords. For example, the result obtained by using a knowledge entry "my sister's birthday is March 20" may include keywords "niece" and "birthday" from the user query "what kind of my niece wants for her birthday" and an indication about word "birthday" in the knowledge entry falling into these keywords. This indication will help information retrieval latter.

Each of the plurality of language understanding results may include other result depending on which pre-trained language understanding model is used. For example, if the plurality of feature vectors is applied to identify the intent of the user, then each language understanding result may include an intent classification.

Figure 4:
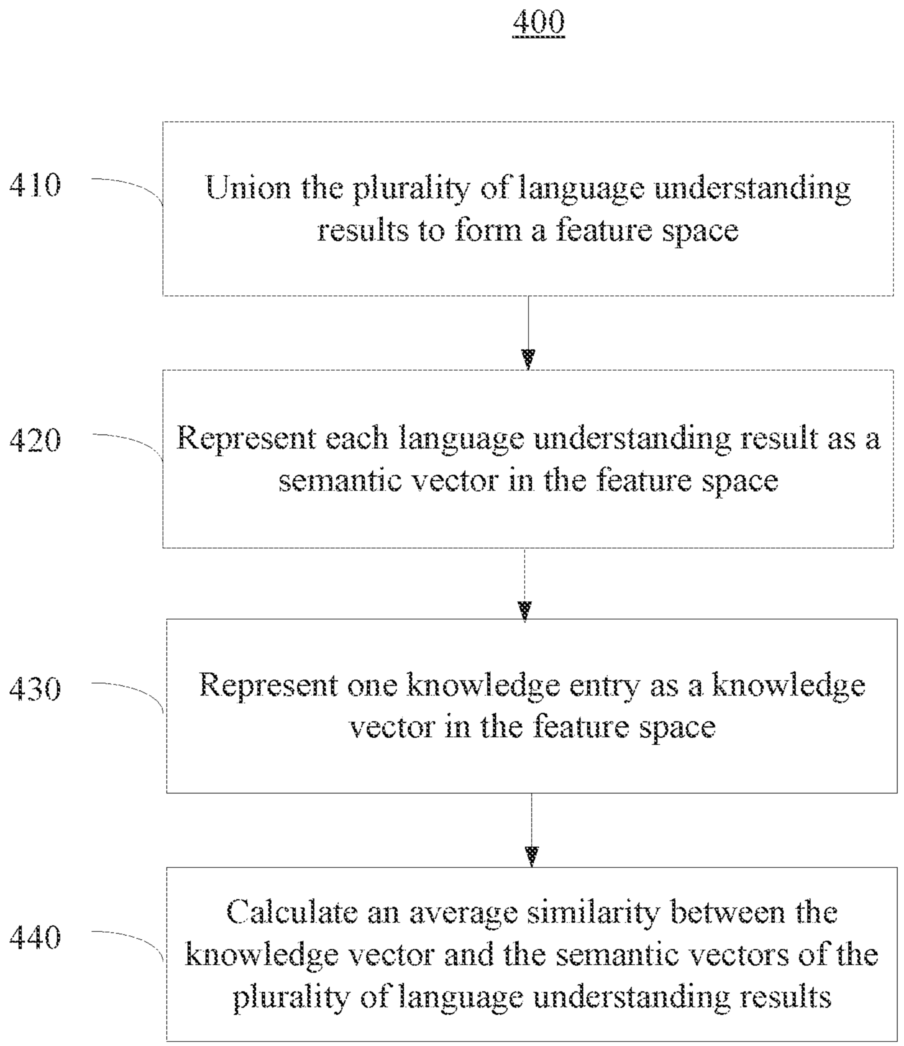
FIG. 4 illustrates a flow chart for calculating a similarity score between one knowledge entry and a user query based on a plurality of language understanding results according to an embodiment of the present disclosure.

In step 240, a knowledge entry corresponding to the query may be selected among the plurality of knowledge entries based on the plurality of language understanding results. In an embodiment of the present disclosure, similarity scores between the plurality of knowledge entries and the query may be calculated based on the plurality of understanding results. Then the knowledge entry corresponding to the query may be selected based on the calculated similarity scores. FIG. 4 will illustrates how to calculate a similarity score between a knowledge entry and the query based on the plurality of language understanding results.

Figure 3A:
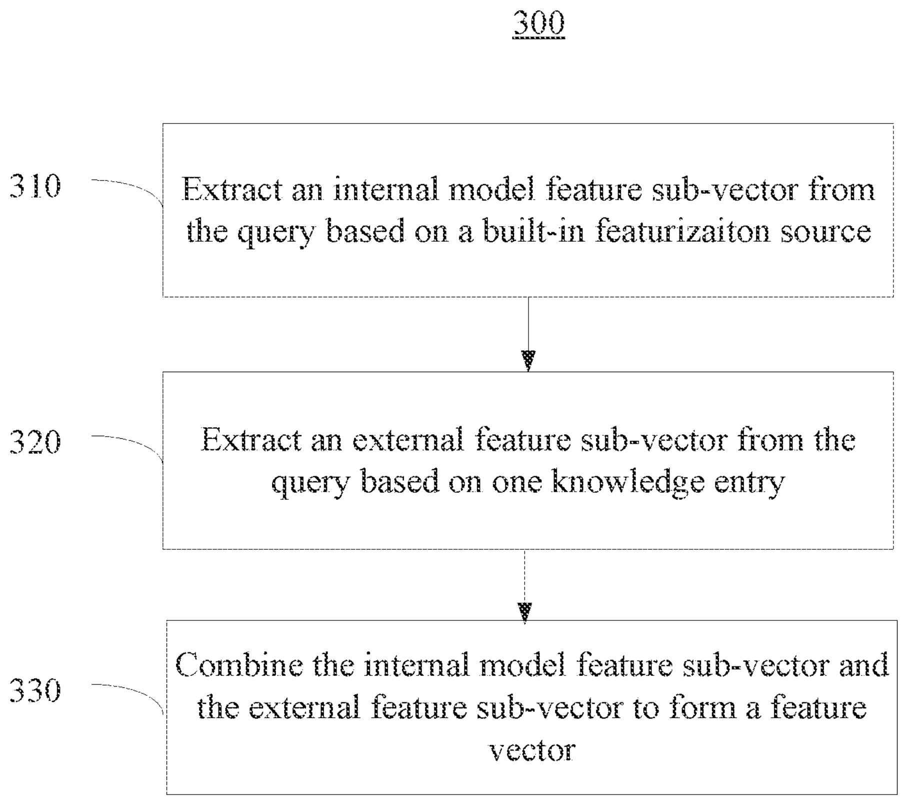
FIG. 3A illustrates a flow chart for extracting one feature vector from a user query according to an embodiment of the present disclosure.

FIG. 3A illustrates a flowchart 300 for extracting one feature vector from a user query.

In step 310, an internal model feature sub-vector may be extracted from the user input based on a built-in featurization source. As described above, the built-in featurization source may include vocabulary from a training data set, pre-defined lexicons and grammars which were used during a training process. In an embodiment of the present disclosure, the ith element in the internal model feature sub-vector may be determined as value 0 or 1 based on whether there is a word in the user query that matches with the ith word of the vocabulary from the training data set.

In step 320, an external feature sub-vector may be extracted from the user query based on one knowledge entry. During the process of training the language understanding model, some prepared files (such as several textfiles describing persons, time, locations and things and a dictionary including synonyms) were used to expand the dimensions of the feature space and model the weights for external features of the model, as described above. In an embodiment of the present disclosure, during the runtime, external feature values corresponding to these expanded dimensions may be extracted from the user query by using an external knowledge entry with annotations, instead of using the built-in featurization source.

For example, the expanded dimensions of the features space may be represented as Exteranl_Typed_Feature_1, Exteranl_Typed_Feature_2, Exteranl_Typed_Feature_3, Exteranl_Typed_Feature_4, and External_Expanded_Feature. The external feature values corresponding to these dimensions may be extracted from the user query based on whether there is a word in the user query that matches with the entities tagged with "Person", "Time", "Location" and "Keyword" and expanded entities in one knowledge entry, respectively. These extracted external feature values may form the external feature sub-vector.

Figure 3B:
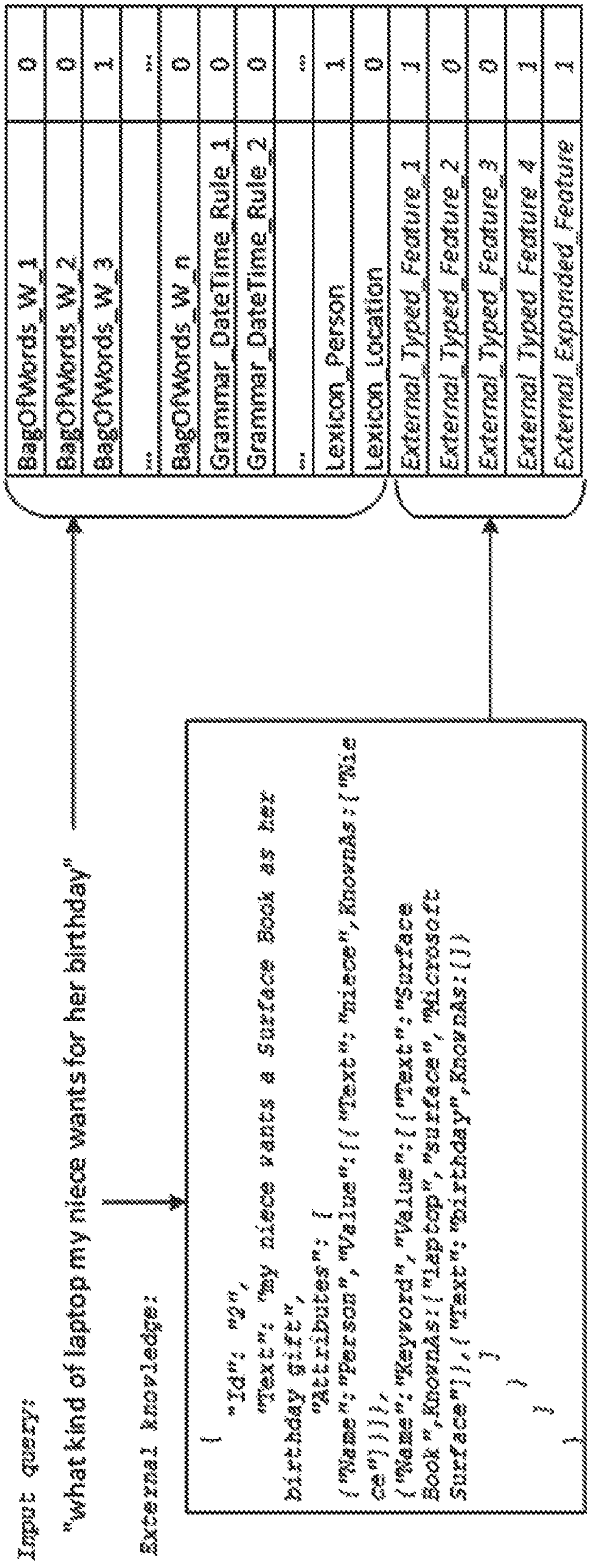
FIG. 3B is a table illustrating an example feature vector extracted from a user vector.

In step 330, the internal model feature sub-vector and the external feature sub-vector may be combined to form a feature vector with same dimension of the pre-trained language model. FIG. 3B illustrates an example feature vector extracted from the user vector. In table 1, the values written in non-italic may represent the internal model feature sub-vector and the values written in italic may represent the external feature sub-vector. In FIG. 3B, the value of External_Typed_Feature_1 is equal to 1, which represents that there is a word (i.e., "niece") in the user query that matches with the entity tagged with "Person" in the second knowledge entry. The value of External_Typed_Feature_4 is equal to 1, which represents that there is a word (i.e. "laptop") in the user query that matches with the entity tagged with "Keyword" in the second knowledge entry. The value of External_Expanded_Feature is equal to 1, which represents there is a word (i.e., "laptop") in the user query that matches with the expanded information "laptop" of the tagged entity "surface book" in the second knowledge entry. Since there is no entity tagged with "Time" or "Location" in the knowledge entry, the values of External_Typed_Feature_2 and External_Typed_Feature_3 are equal to 0.

By repeating the flow chart described in FIG. 3, a plurality of feature vectors may be extracted from the user based on the built-in feat urination source and a plurality of knowledge entries in a knowledge base associated with the user.

FIG. 4 illustrates a flow chart 400 for calculating a similarity score between one knowledge entry and the query based on the plurality of language understanding results.

For the purpose of simplicity, a simple scenario where there are two knowledge entries may be considered in FIG. 4. In this scenario, the first knowledge entry is {"Id":"1", "Text":"my niece's birthday is May 4th","Attributes": [{"Name":"Person","Value":[{"Text":"niece",KnownAs: ["Niece"]}]},{"Name":"Time","Value":[{"Text":"May 4th",KnownAs:["XXXX-05-04"]}]},{"Name":"Keyword", "Value":[{"Text":"birthday",KnownAs:[ ]}]}]}, and the second knowledge entry is {"Id":"2","Text":"my niece wants a Surface Book as her birthday gift","Attributes": [{"Name":"Person","Value":[{"Text":"niece",KnownAs: ["Niece"]}]},{"Name":"Keyword","Value":[{"Text":"Surface Book",KnownAs:["laptop","surface","Microsoft Surface"]},{"Text":"birthday",KnownAs:[ ]}]}]}. The first language understanding result obtained based on the first knowledge entry may include a first set of keywords ("niece", "birthday") and a first indication about the entity "niece" tagged with "Person" and the entity "birthday" tagged with "Keyword" in the first knowledge entry falling into the first set of keywords. The second language understanding result obtained based on the second knowledge entry may include a second set of keywords ("niece", "birthday", "laptop") and a second indication about the entity "niece" tagged with "Person", the entity "surface book" tagged with "Keyword" and the entity "birthday" tagged with "Keyword" in the second knowledge entry falling into the second set of keywords.

In step 410, the plurality of language understanding results may be unioned to form a new feature space. In the described scenario, the first set of keywords and the second set of keywords may be unioned to form a new feature space having three dimensions ("niece", "birthday", "laptop"). In a complex scenario where the language understanding result may include other tagged slots, the formed feature space may have more dimensions.

In step 420, each of the plurality of language understanding results may be represented as a semantic vector in the new feature space. For example, the first set of keywords ("niece", "birthday") may be represented as a first semantic vector (1, 1, 0) in the feature space. The second set of keywords ("niece", "birthday", "laptop") may be represented as a second semantic vector (1, 1, 1) in the feature space.

In step 430, one knowledge entry may be represented as a knowledge vector in the new feature space. In an embodiment of the present disclosure, one knowledge entry may be represented as a vector in the new space based on the indication in the respective language understanding result obtained based on the one knowledge entry. For example, the first knowledge entry may be represented as a first knowledge vector (1, 1, 0) in the space based on the first indication.

In step 440, an average similarity between the knowledge vector and the semantic vectors of the plurality of language understanding results may be calculated as the similarity score between the one knowledge entry and the user query. For example, the first similarity, such as a cosine distance, between the first knowledge vector (1, 1, 0) and the first semantic vector (1, 1, 0) may be calculated. The second similarity between the first knowledge vector (1, 1, 0) and the second semantic vector (1, 1, 1) may be calculated. Then the first and second similarities may be averaged as the similarity score between the first knowledge entry and the user query.

By using the similar process, the similarity score between the second knowledge entry and the user query may be calculated. The one of the first knowledge entry and the second entry having the highest similarity score may be selected as the knowledge entry corresponding to the user query.

Figure 5:
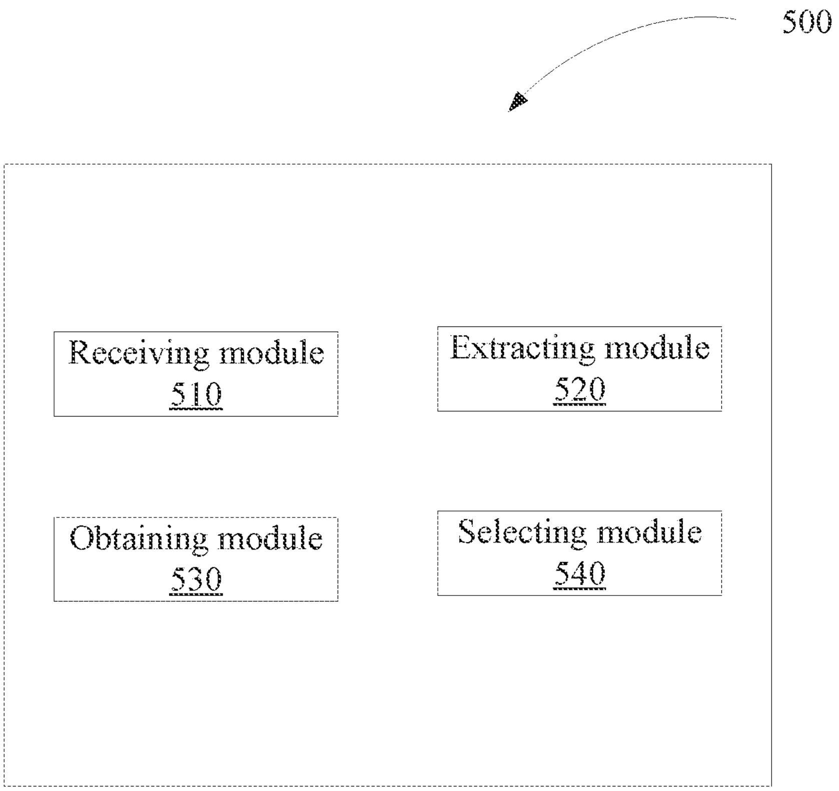
FIG. 5 illustrates an exemplary apparatus for information retrieval according to an embodiment of the present disclosure.

FIG. 5 illustrates an apparatus 500 for information retrieval according to The apparatus 500 may comprises: an receiving model 510 for receiving a query in a natural language form from a user; an extracting model 520 for extracting a plurality of feature vectors from the query based on a built-in featurization source and a plurality of knowledge entries in a knowledge base associated with the user, one feature vector per knowledge entry: an obtaining module 530 for obtaining a plurality of language understanding results with a pre-trained language model based on the plurality of feature vectors: and a selecting model 540 for selecting an knowledge entry corresponding to the query among the plurality of knowledge entries based on the plurality of language understanding results.

In one embodiment, the extracting model 510 may be configured for extracting an internal model feature sub-vector based on the built-in featurization source, extracting an external feature sub-vector based on one knowledge entry, and combining the internal model feature sub-vector and the external feature sub-vector to form one of the plurality of feature vectors.

In one embodiment, the selecting model 520 may be configured for calculating similarity scores between the plurality of knowledge entries and the query based on the plurality of language understanding results: and selecting the knowledge entry corresponding to the query based on the calculated similarity scores.

In one embodiment, the selecting module 520 may be further configured for calculating a similarity score between one of the plurality of knowledge entries and the query, comprising: unioning the plurality of language understanding results to form a feature space: representing each of the plurality of language understanding results as a semantic vector in the feature space; representing the one of the plurality of knowledge entries as a knowledge vector in the feature space: calculating an average similarity between the knowledge vector and semantic vectors of the plurality of language understanding results as the similarity score between the one of the plurality of knowledge entries and the query.

In one embodiment, the plurality of knowledge entries may be tagged with schematized information and expanded by applying semantic expansion or data mining techniques, and each of the plurality of language understanding results may include a set of keywords from the query and an indication about which tagged entities in a respective knowledge entry falling into the set of keywords. The selecting module may be further configured for representing the one of the plurality of knowledge entries as a knowledge vector in the feature space based on the indication in a language understanding result obtained based on the one of the plurality of knowledge entries.

Moreover, the apparatus 500 may also comprise any other modules configured for implementing functionalities corresponding to any steps of the method for information retrieval according to the present disclosure.

Figure 6:
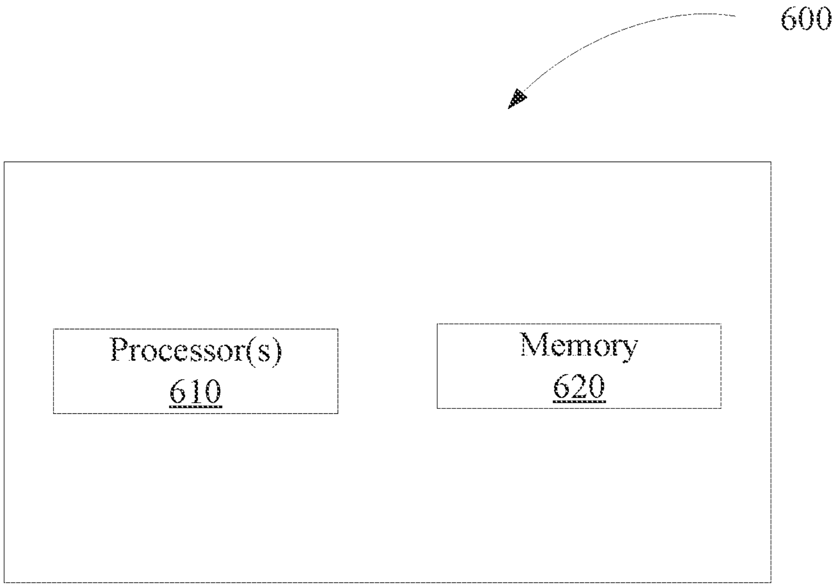
FIG. 6 illustrates an exemplary system for information retrieval according to an embodiment of the present disclosure.

FIG. 6 illustrates an exemplary system 600 for information retrieval according to an embodiment of the present disclosure. The system 600 may comprise one or more processors 610. The system 600 may further comprise a memory 620 that is connected with the one or more processors. The memory 620 may store computer-executable instructions that, when executed, cause the one or more processors to perform any steps of the method for information retrieval according to the present disclosure.

The solution of the present disclosure may be embodied in a non-transitory computer-readable medium. The non-transitory computer-readable medium may comprise instructions that, when executed, cause one or more processors to perform any steps of the method for information retrieval according to the present disclosure.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gale array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a Hash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

It is to be understood that the order of steps in the methods disclosed is an illustration of exemplary processes. Based upon design preferences, it is understood that the order of steps in the methods may be rearranged.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for information retrieval, comprising:
- receiving a query in a natural language form from a user;
- extracting a plurality of feature vectors from the query based on words in the query that match words in a plurality of knowledge entries in a knowledge base associated with the user and a built-in featurization source, one feature vector per knowledge entry wherein the plurality of knowledge entries comprise reminders previously provided by the user;
- obtaining, with a pre-trained language understanding model, a plurality of language understanding results based on the plurality of feature vectors; and
- selecting a knowledge entry corresponding to the query among the plurality of entries based on the plurality of language understanding results.

2. The method of claim 1, wherein the plurality of reminders are pre-annotated with schematized information using language understanding techniques.

3. The method of claim 2, wherein the plurality of knowledge entries are expanded by applying semantic expansion or data mining techniques.

4. The method of claim 3, wherein extracting the plurality of feature vector comprising extracting one of the plurality of feature vectors from the query based on one of the plurality of knowledge entries and the built-in featurization source.

5. The method of claim 4, wherein extracting one of the plurality of feature vectors comprising:
- extracting an internal model feature sub-vector from the query based on the built-in featurization source, wherein the built-in featurization source comprises data from a training dataset used to train the language understanding model;
- extracting an external feature sub-vector from the query based on the one of the plurality of knowledge entries; and
- combining the internal model feature sub-vector and the external feature sub-vector to form the one of the plurality of feature vectors.

6. The method of claim 5, wherein an element of the external feature sub-vector representing whether there is a word in the query matching with a tagged entity or expanded entity in the one of the plurality of knowledge entries.

7. The method of claim 3, wherein the selecting further comprising:

calculating similarity scores between the plurality of knowledge entries and the query based on the plurality of language understanding results; and selecting the knowledge entry corresponding to the query based on the calculated similarity scores.

8. The method of claim 7, wherein the calculating comprising calculating a similarity score between one of the plurality of knowledge entries and the query, comprising:

unioning the plurality of language understanding results to form a feature space;

representing each of the plurality of language understanding results as a semantic vector in the feature space;

representing the one of the plurality of knowledge entries as a knowledge vector in the feature space;

calculating an average similarity between the knowledge vector and semantic vectors of the plurality of language understanding results as the similarity score between the one of the plurality of knowledge entries and the query.

9. The method of claim 8, wherein each of the plurality of language understanding results including a set of keywords from the query and an indication about which tagged entities in a respective knowledge entry falling into the set of keywords, and wherein representing the one of the plurality of knowledge entries as a knowledge vector comprising representing the one of the plurality of knowledge entries as a knowledge vector in the feature space based on the indication in a language understanding result obtained based on the one of the plurality of knowledge entries.

10. The method of claim 1, wherein the pre-trained language understanding model comprising one of a slot understanding annotation model and an intent understanding classification model, and wherein the reminders previously provided by the user comprise user speech converted to text.

11. An apparatus for information retrieval, comprising:

a receiving module configured for receiving a query in a natural language form from a user;

an extracting module configured for extracting a plurality of feature vectors from the query based on words in the query that match words in a plurality of knowledge entries in a knowledge base associated with the user and a built-in featurization source, one feature vector per knowledge entry wherein the plurality of knowledge entries comprise reminders previously provided by the user;

an obtaining module configured for obtaining, with a pre-trained language understanding model, a plurality of language understanding results based on the plurality of feature vectors; and a selecting module configured for selecting a knowledge entry corresponding to the query among the plurality of knowledge entries based on the plurality of language understanding results.

12. The apparatus of claim 11, wherein the plurality of reminders are pre-annotated with schematized information using language understanding techniques.

13. The apparatus of claim 12, wherein the extracting module further configured for extracting one of the plurality of feature vectors from the query based on one of the plurality of knowledge entries and the built-in featurization source.

14. The apparatus of claim 13, wherein the extracting module further configured for:

extracting an internal model feature sub-vector from the query based on the built-in featurization source, wherein the built-in featurization source comprises data from a training dataset used to train the language understanding model;

extracting an external feature sub-vector from the query based on the one of the plurality of knowledge entries; and combining the internal model feature sub-vector and the external feature sub-vector to form the one of the plurality of feature vectors.

15. The apparatus of claim 14, wherein an element of the external feature sub-vector representing whether there is a word in the query matching with a tagged entity or expanded entity in the one of the plurality of knowledge entries.

16. The apparatus of claim 12, wherein the selecting module further configured for:

calculating similarity scores between the plurality of knowledge entries and the query based on the plurality of language understanding results; and selecting the knowledge entry corresponding to the query based on the calculated similarity scores.

17. The apparatus of claim 16, wherein the selecting module further configured for calculating a similarity score between one of the plurality of knowledge entries and the query, comprising:

unioning the plurality of language understanding results to form a feature space;

representing each of the plurality of language understanding results as a semantic vector in the feature space;

representing the one of the plurality of knowledge entries as a knowledge vector in the feature space;

calculating an average similarity between the knowledge vector and semantic vectors of the plurality of language understanding results as the similarity score between the one of the plurality of knowledge entries and the query.

18. The apparatus of claim 17, wherein each of the plurality of language understanding results including a set of keywords from the query and an indication about which tagged entities in a respective knowledge entry falling into the set of keywords, and wherein the selecting module further configured for representing the one of the plurality of knowledge entries as a knowledge vector in the feature space based on the indication in a language understanding result obtained based on the one of the plurality of knowledge entries.

19. The apparatus of claim 11, wherein the pre-trained language understanding model comprising one of a slot understanding annotation model and an intent understanding classification model, and wherein the reminders previously provided by the user comprise user speech converted to text.

20. A computing system, comprising:

one or more processors; and a memory, storing computer-executable instructions that, when executed, cause the one or more processors to perform receiving a query in a natural language form from a user;

extracting a plurality of feature vectors from the query based on words in the query that match words in a plurality of knowledge entries in a knowledge base associated with the user and a built-in featurization source, one feature vector per knowledge entry wherein the plurality of knowledge entries comprise reminders previously provided by the user;

obtaining, with a pre-trained language understanding model, a plurality of language understanding results based on the plurality of feature vectors; and selecting a knowledge entry corresponding to the query among the plurality of entries based on the plurality of language understanding results.

* * * * *